Patented Jan. 6, 1953

2,624,664

UNITED STATES PATENT OFFICE 2,624,664

HERBICIDES

David T. Mowry and Arthur H. Schlesinger, Dayton, Ohio, assignors to Monsanto Chemical Company, St. Louis, Mo., a corporation of Delaware No Drawing. Application February 25, 1950,
Serial No. 146,392

8 Claims. (Cl. 71—2.5)

The present invention relates to herbicides and deals more particularly with methods for the general destruction of undesired plants.

A number of herbicides are known, a variety of organic and inorganic compounds having been suggested in prior art for use as plant-killers. Many of such prior materials have a selective activity, i. e., when employed in certain concentrations they destroy only certain plants without harming adjacent growth of different species. Hence, such herbicides are not of general usefulness and are of little value in clearing large areas such as railway sidings, parking lots, etc. Among other disadvantages of prior herbicides may be mentioned corrosive effect on equipment, water-insolubility (and hence the necessity of flammable or obnoxious spray media), chemical reactivity with other components customarily employed in agricultural sprays or powders, instability when exposed for long periods of time to ordinary atmospheric conditions, and soil instability, e. g., chemical reactivity and susceptibility to decomposition by soil microorganisms which results in loss of the active material.

Now, we have found that highly stable, non-corrosive herbicidal compositions are obtained by employing as the active ingredient a thianaphthene derivative having the general formula:

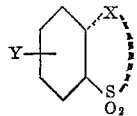

in which Y is a member of the group consisting of hydrogen and the nitro group and X represents a bivalent radical necessary to complete a five-membered ring and selected from the class consisting of

where R is a member of the group consisting of hydrogen, chlorine and bromine.

One class of compounds having the above general formula consists of thianaphthene-1-dioxide and derivatives thereof and has the general structure:

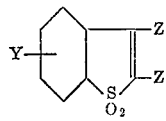

in which Z is a member of the group consisting of hydrogen, chlorine and bromine and Y is a member of the group consisting of hydrogen and the nitro group. This class includes thianaphthene-1-dioxide and derivatives thereof having the structure:

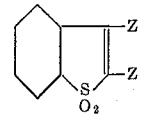

in which Z is as defined above, i. e., 2-chloro and 2-bromothianaphthene-1-dioxide, 3-chloro and 2-bromothianaphthene-1-dioxide, 2,3 - dichloro- and 2,3-dibromothianapthene-1-dioxide. Also included are the corresponding nitro derivatives having the general formula:

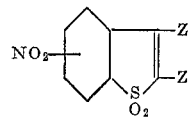

in which Z is as defined above, i. e., 6-nitrothianaphthene-1-dioxide and nitrochloro-, nitrobromo-, nitrodichloro- and nitrodibromo- derivatives of thianaphthene-1-dioxide in which the halogen substitutents are in the 2- and/or 3-position and the nitro group is in the aromatic ring.

Still another class of thianaphthene compounds encompassed by the invention consists of the dihydrogenated thianaphthene-1-dioxides having the formula:

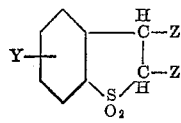

in which Y and Z are as defined above. e. g., 2,3-dihydrothianaphthene-1 - dioxide; 2,3 - dichloro-2,3-dihydrothianaphthene-1-dioxide; 2,3-dibromo-2,3-dihydrothianaphthene - 1 - dioxide and derivatives thereof having a nitro substituent in the aromatic ring.

Thianaphthene - 1 - dioxide and derivatives thereof having the above general formula may be readily prepared in known manner, for example as described by Challenger and Clapham (J. Chem. Soc., p. 1615 for 1948), Lanfry (Compt. rend. 154, 519 for 1912), and Weissgerber and Kruber (Ber. 53, 1554 for 1920). Generally, thianaphthene or a nitro, chloro and/or bromothianaphthene may be converted to the corresponding 1-dioxide by reaction with hydrogen peroxide in glacial acetic acid. 2,3-dihydrothianaphthene-1-dioxide, 2,3-dichloro-2,3-dihydrothianaphthene or 2,3-dibromo-2,3-dihydrothianaphthene or the nitro derivatives thereof may be easily prepared by reaction of thianaphthene-1-dioxide or substitution products thereof with hydrogen, chlorine or bromine, addition occurring at the 2,3-olefinic double bond of the thianaphthene compound to yield the 2,3-dihydro derivatives.

The thianaphthene-1-dioxides herein disclosed are effective over wide ranges of concentrations. Their effects may be measured by determining the inhibition of root growth as compared to similar untreated plants. The general usefulness of a herbicide may be measured by comparing the concentrations of a herbicide required to produce a certain inhibition on a broad-leafed plant with the concentrations of a herbicide required to produce the same inhibition on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited, by the following examples:

Example 1

Seventy-five seeds are placed on filter paper in petri dishes and germinated in the presence of water or dilute aqueous solution of the chemical in the dark at 75° C. The average growth of the primary root is then measured and compared with controls growing in contact with pure water. The per cent of normal growth of cucumber seeds was measured for each of the following compounds at the aqueous concentrations indicated below:

|  | Per cent growth at 100 parts per million |
| --- | --- |
| Thianaphthene-1-dioxide | 3 |
| 6-nitrothianaphthene-1-dioxide | 1 |
| 3-chlorothianaphthene-1-dioxide | 2 |
| 2-chlorothianaphthene-1-dioxide | 2 |
| 2,3-dichlorothianaphthene-1-dioxide | 5 |
| 2,3-dichloro-2,3-dihydrothianaphthene-1-dioxide | 3 |
| 2-bromothianaphthene-1-dioxide | 3 |
| 2,3-dibromo-2,3-dihydrothianaphthene-1-dioxide | 5 |
| Isopropyl carbanilate | 7 |
| 2,4-dichlorophenoxyacetic acid | 6 |

At this concentration the present compounds permit less growth than isopropyl carbanilate and 2,4-dichlorophenoxyacetic acid, two previously known herbicides. The herbicidal efficiency of the above thianaphthene-1-dioxides is remarkable, because as shown in the table given below, all thianaphthene compounds do not possess great herbicidal efficiency. When tested as described above, aqueous solutions of a random group of such derivatives were found to have the following effects:

|  | Percent growth at 100 parts per million |
| --- | --- |
| Thianaphthene | 86 |
| 3-thianaphtheneacetic acid-1-dioxide | 31 |
| 3-thianaphthenecarboxylic acid-1-dioxide | 104 |
| 2-chloro-3-methoxythianaphthene-1-dioxide | 71 |
| 3-chlorothianaphthene | 58 |
| 2,3-dichlorothianaphthene | 32 |

Example 2

Thianaphthene-1-dioxide and its 2,3-dichloro derivative were tested with both cucumber and wheat seeds and the percentage of growth inhibition measured for various concentrations. The concentration of each compound which permitted 20 per cent of normal growth (80 per cent inhibition) was determined for seeds of cucumber and wheat, respectively. The following results, expressed as parts per million of the herbicide, were obtained:

|  | Cucumber | Wheat | Ratio |
| --- | --- | --- | --- |
| Thianaphthene-1-dioxide | 19.0 | 22.0 | 1.1 |
| 2,3-Dichlorothianaphthene-1-dioxide | 20.0 | 500.0 | 25.0 |

The low narrow leaf: broad-leaf ratio obtained for thianaphthene-1-dioxide indicates general utility against both types of plants and that of the dichloro-derivative thereof indicates a selectivity of action useful in control of broad-leafed weeds in small grain crops and on lawns.

The present thianaphthene-1-dioxide compounds are preferably applied by spraying an aqueous solution or emulsion of the same, this method affording an easy and inexpensive way of destroying plant growth. However, thianaphthene-1-dioxide and its mono-, nitro-, chloro- or bromo- derivatives are likewise effective when applied in agricultural dusts; or they may be used with water-insoluble insecticides, fungicides, etc. in customarily employed organic solutions.

The aqueous solutions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

0.1 parts to 20 parts of the thianaphthene-1-dioxide compound per hundred parts by weight of the carrier may be employed, and in this manner an acre of land may be freed of plants by application of only a few pounds of one of the present herbicides.

We claim:

1. A method for the destruction of plants which comprises applying to said plants a toxic quantity of a herbicidal composition comprising a carrier and, as the active ingredient, a compound having the formula

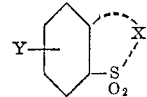

in which Y is a member of the group consisting of hydrogen and the nitro group and X represents a bivalent radical necessary to complete a five-membered ring and selected from the class consisting of

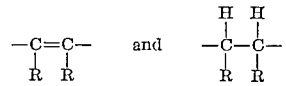

wherein R is a member of the group consisting of hydrogen, chlorine and bromine.

2. A method for the destruction of plants which comprises applying to said plants a toxic quantity of a herbicidal composition comprising a carrier and, as the active ingredient, a chlorine-substituted thianaphthene-1-dioxide, said chlorine being attached to a carbon atom of the five-membered ring portion of said dioxide.

3. A method for the destruction of plants which comprises applying to said plants a toxic quantity of a herbicidal composition comprising a carrier and, as the active ingredient, a bromine-substituted thianaphthene-1-dioxide, said bromine being attached to a carbon atom of the five-membered ring portion of said dioxide.

4. A method for the destruction of plants which comprises applying to said plants a toxic quantity of a herbicidal composition comprising a carrier and thianaphthene-1-dioxide as the active ingredient.

5. A method for the destruction of plants which comprises applying to said plants a toxic quantity of a herbicidal composition comprising a carrier and 2-chlorothianaphthene-1-dioxide as the active ingredient.

6. A method for the destruction of plants which comprises applying to said plants a toxic quantity of a herbicidal composition comprising a carrier and 6-nitrothianaphthene-1-dioxide as the active ingredient.

7. A method for the destruction of plants which comprises applying to said plants a toxic quantity of a herbicidal composition comprising a carrier and 2,3-dibromo-2,3-dihydrothianaphthene-1-dioxide as the active ingredient.

8. A method for the destruction of plants which comprises applying to said plants a toxic quantity of a herbicidal composition comprising a carrier and 2-bromothianaphthene-1-dioxide as the active ingredient.

DAVID T. MOWRY.
ARTHUR H. SCHLESINGER.

REFERENCES CITED

The following references are of record in the file of this patent:

Challanger, J. Chem. Society (London), 1948, pp. 1615 to 1618.